J. G. HOCK.
Fastening for Gas-Retort Lids.
No. 14,913.  Patented May 20, 1856.
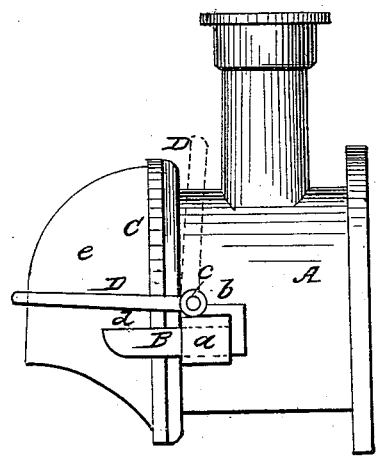
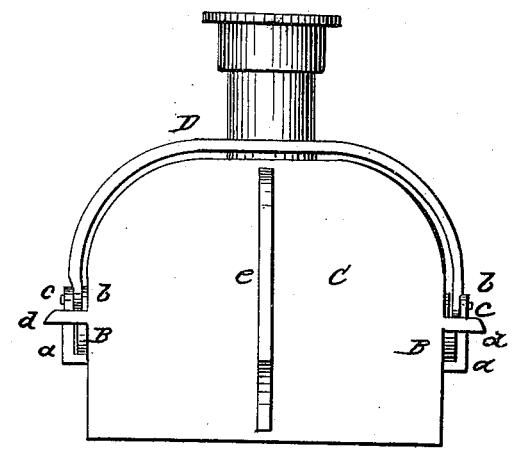
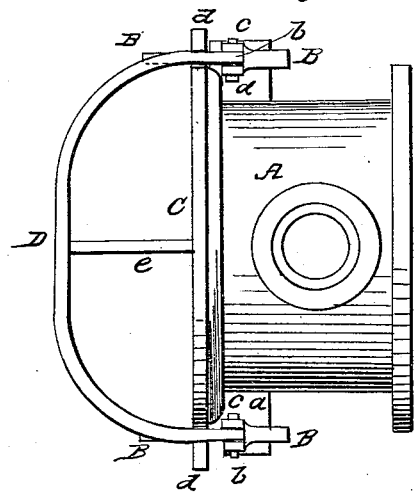
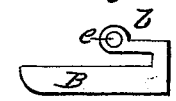

UNITED STATES PATENT OFFICE.

JOHN G. HOCK, OF NEWARK, NEW JERSEY.

GAS-RETORT FASTENING.

Specification of Letters Patent No. 14,913, dated May 20, 1856.

*To all whom it may concern:*

Be it known that I, JOHN G. HOCK, of Newark, in the county of Essex and State of New Jersey, have invented a new and Improved Fastening for the Heads of Gas-Retorts and other Similar Covers; and I do hereby declare that the following is a full, clear, and exact description of the same, reference being had to the accompanying drawings, making a part of this specification, in which—

Figure 1, is a side view of the neck and head of a retort with my improved fastening. Fig. 2, is a front view of the same. Fig. 3, is a top view of the same, Fig. 4, is a detached view of one of the hook bolts of the fastening.

Similar letters of reference indicate corresponding parts in the several figures.

The object of this invention is to enable the heads of the retorts to be more handily and quickly attached and detached than the mode of fastening them, at present in general use, admits of. Another object is to enable the fastening to be readily detached from a worn out retort and applied to a new one.

To enable others skilled in the are to make and use my invention, I will proceed to describe its construction and operation.

A, is the neck of the retort which is of the usual form, having a flanged mouth, but for the purpose of applying my improved fastening it is cast with a strong lug, a, on each side close to the mouth, said lug having a square hole through it to receive the square shank of one of two hook headed bolts B, B, which with a bail D and an inclined projecting rib e, on the outside of the head C, of the retort, constitute the fastening. The hook headed bolts B, B, are made with their shanks of such length that, when inserted through the lugs from the backside thereof, as shown in Fig. 1, the said shanks will protrude some distance beyond the front of the mouth. The hook heads of the bolts B, B are formed with knuckles b, b, at the ends of their hooks which are intended to hook over the top of their respective lugs a, a, as shown in Fig. 1, said knuckles being for the purpose of attaching the bail D by pins c, c. The bail is of such form that it may be thrown back over the neck of the retort as shown in Fig. 2, and in dotted outline in Fig. 1. The hook headed bolts may be made of malleable cast iron or of wrought iron. The bail should be of wrought iron. The head of the retort is of a proper form to fit up to the flanged mouth of the neck of the retort. It has two lugs d, d, so placed that when it is in place the said lugs rest on the shanks of the hook bolts which protrude through the lugs a, a, of the neck, besides having the inclined rib e, in front. This inclined rib is of such form, (shown in Fig. 1) as to allow the bail to swing back over it to the position shown in dotted lines in Fig. 1, but that when the bail is brought down over it as shown in bold outline in the same figure, the rib will have a wedge like action in the bail, that will draw the hook heads of the bolts close up to the back of the lugs a, a, of the retort mouth and force the head C, close up to the mouth.

To fasten or unfasten the head it is only necessary to bring down the bail to the position shown in bold outline in Fig. 1, which is also shown in Fig. 3, or to lift it up and throw it back to the position shown in dotted outline in Fig. 1, which is also shown in Fig. 2. A hammer may be used, if necessary, to drive the bail down tight or knock it up. When the bail is thrown off the rib e, the head remains supported by the lugs a, a, resting on the shanks of the bolts B, B, so that the bolts serve not only to attach the bail but to support the head. The bolts also serve as guides for the head in putting it up to the mouth of the retort.

This fastening can be readily detached from a retort when the latter is burned out, and applied to a new one; all that is necessary to detach it being to throw the bail over on to the neck of the retort and drive the bolts backward from the lugs a, a, with a hammer. One of these fastenings will outlast several retorts. The same kind of fastening may be applied to man-hole covers and to any covers requiring to be securely fastened but readily detached.

What I claim as my invention and desire to secure by Letters Patent, is,

The attachment of the bail to the retort or other mouth by means of the hook headed bolts, B, B, constructed, applied, and operating substantially as herein described.

JOHN G. HOCK.

Witnesses:
S. H. WALES,
WM. TUSCH.